Jan. 7, 1936.  R. B. BRYANT  2,026,820
AUTOMATIC PHONOGRAPH
Filed Sept. 29, 1930  6 Sheets-Sheet 3

Inventor
R. B. Bryant
By Jack A. Ashley
Attorney

Jan. 7, 1936.  R. B. BRYANT  2,026,820
AUTOMATIC PHONOGRAPH
Filed Sept. 29, 1930  6 Sheets-Sheet 4

Inventor
R. B. Bryant

Jack Ashley
Attorney

Jan. 7, 1936.  R. B. BRYANT  2,026,820
AUTOMATIC PHONOGRAPH
Filed Sept. 29, 1930    6 Sheets-Sheet 6.
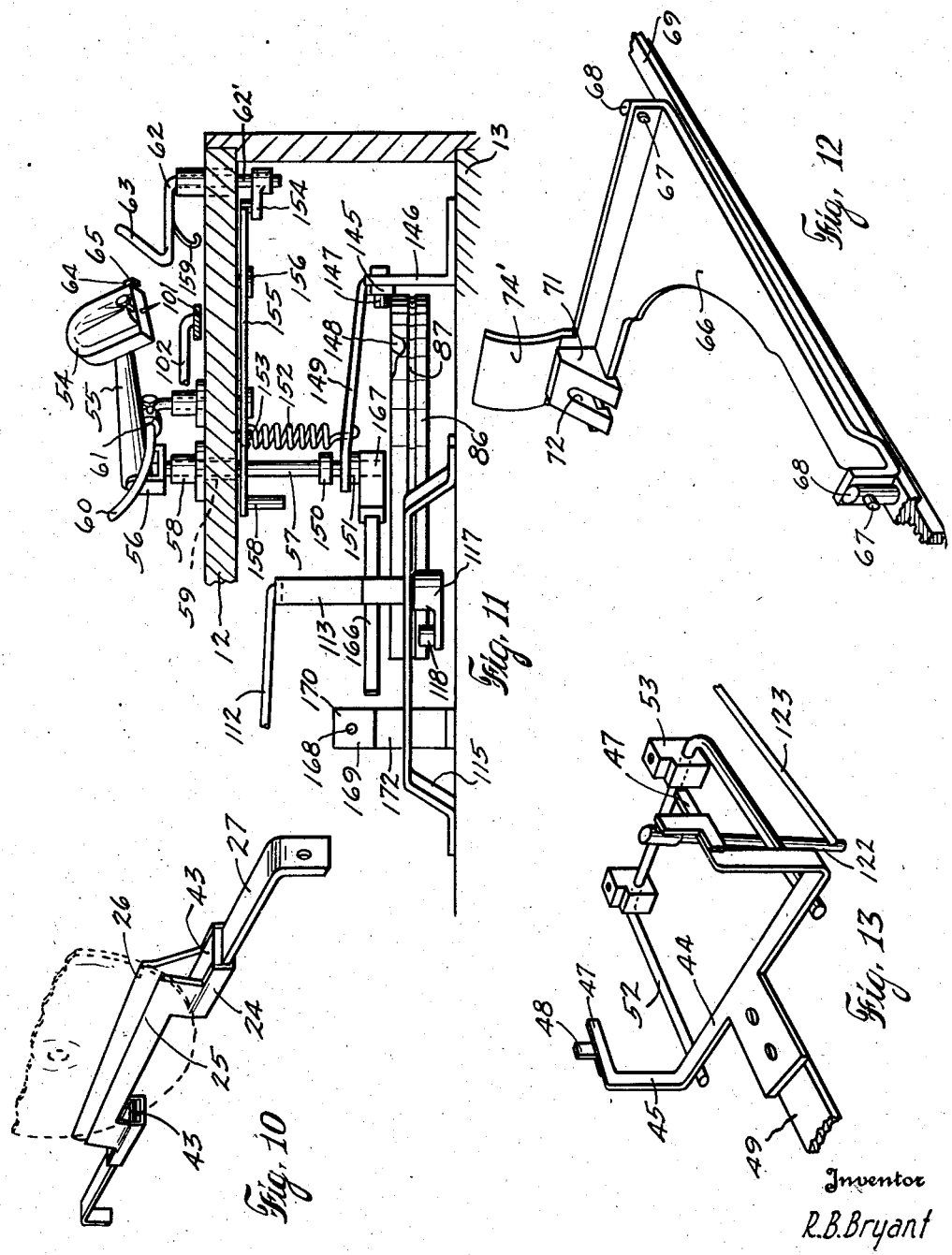

Patented Jan. 7, 1936

2,026,820

UNITED STATES PATENT OFFICE 2,026,820

AUTOMATIC PHONOGRAPH

Roy B. Bryant, Dallas, Tex.

Application September 29, 1930, Serial No. 484,997

9 Claims. (Cl. 274—10)

This invention relates to new and useful improvements in automatic phonographs.

A particular object of the invention is to provide means for transferring records of various sizes from a supply stack to a rotatable turntable, whereby said records are positioned during the transferring operation so as to be centered on said turntable.

Another object of the invention is to provide means for discharging the records from the turntable and returning them to the supply stack in conjunction with means for aligning the records in said stack for engagement by the transferring means, whereby records of various sizes may be successively reproduced.

An important object of the invention is to provide means for reversing the record just reproduced, whereby both sides of said record may be successively reproduced.

A further object of the invention is to provide improved means for lifting the reproducer from contact with the records during the transferring and removing actions, together with improved means for positioning and lowering the reproducer onto the various size records at the beginning of their scores.

A still further object of the invention is to provide adjustable means for aligning a supply stack of single size records for engagement by the transferring means.

A construction designed to carry out the invention will be hereinafter described together with other features of the invention.

Figure 1:
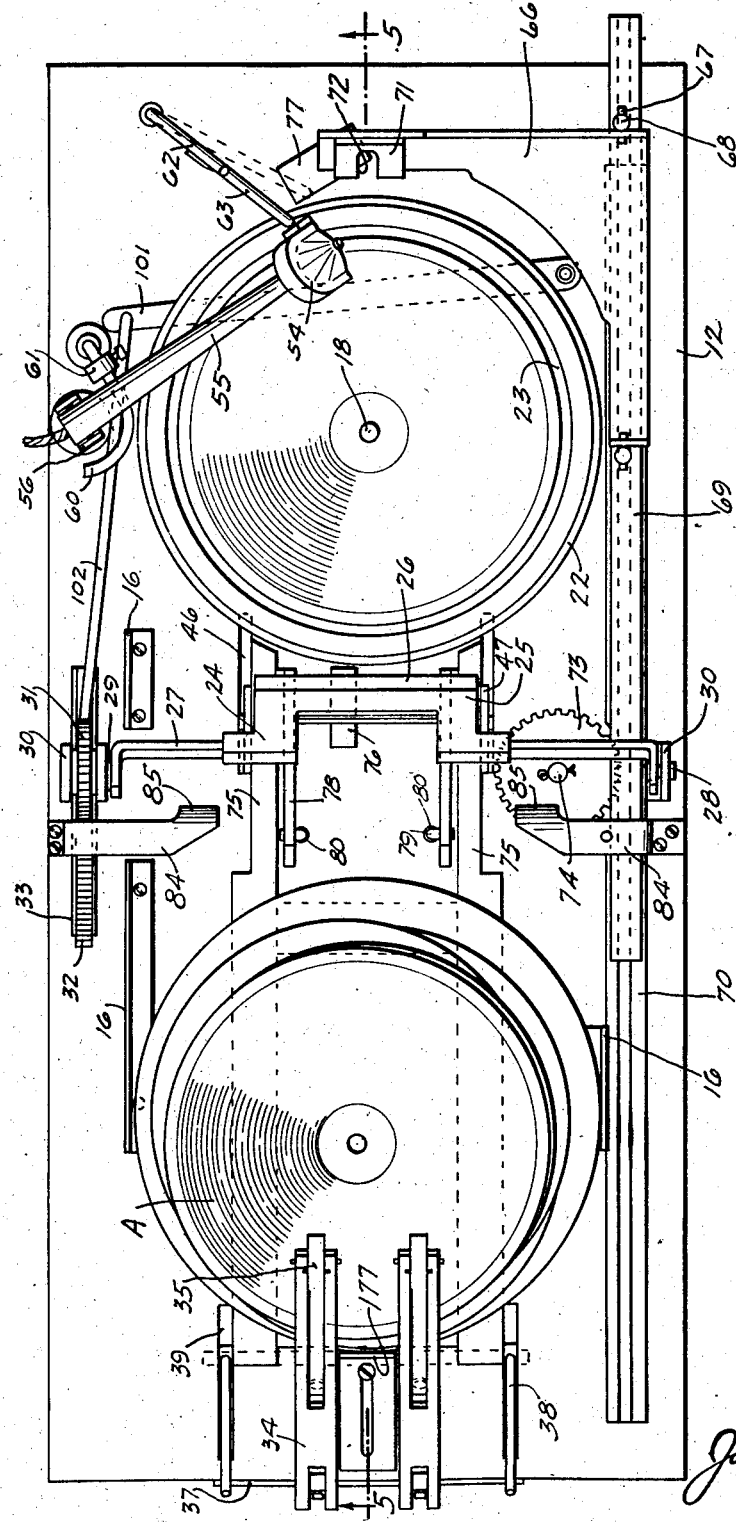
Figure 2:
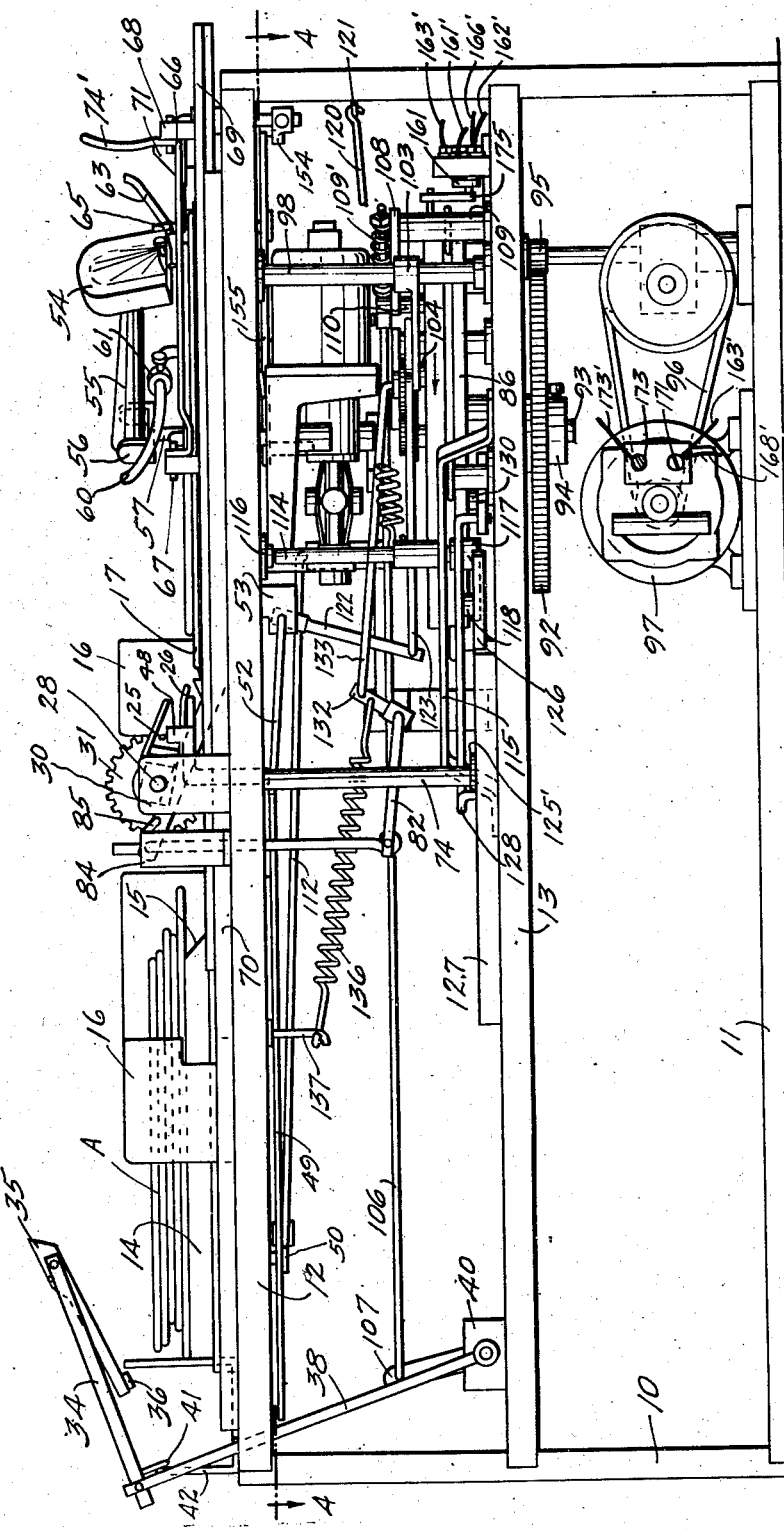
Figure 3:
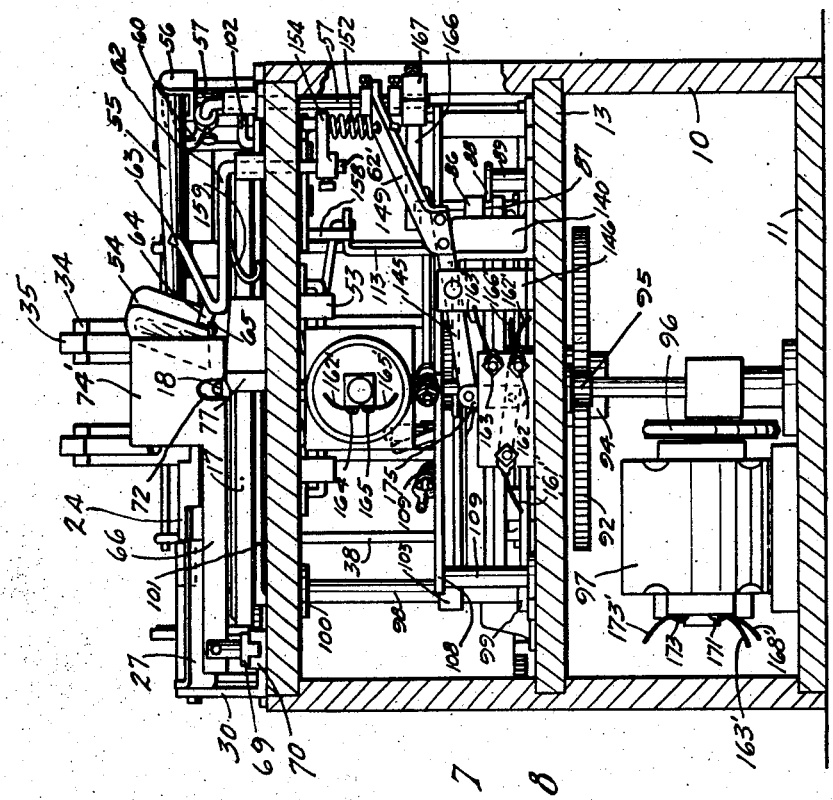
Figure 6:
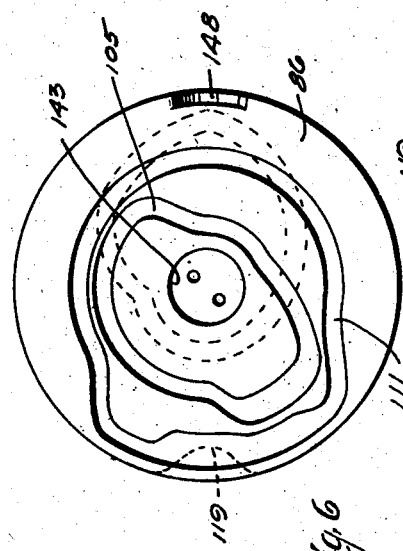
Figures 7, 8:
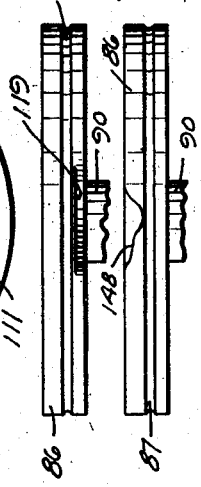
Figure 9:
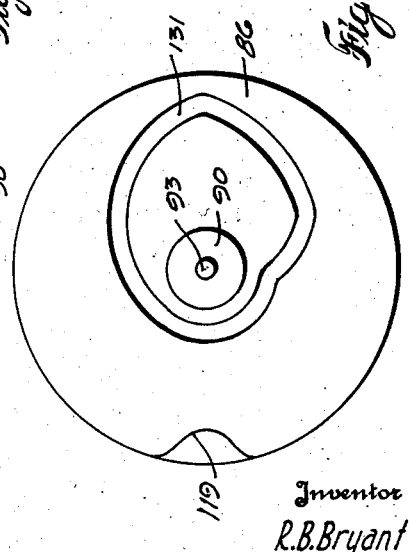
Figure 4:
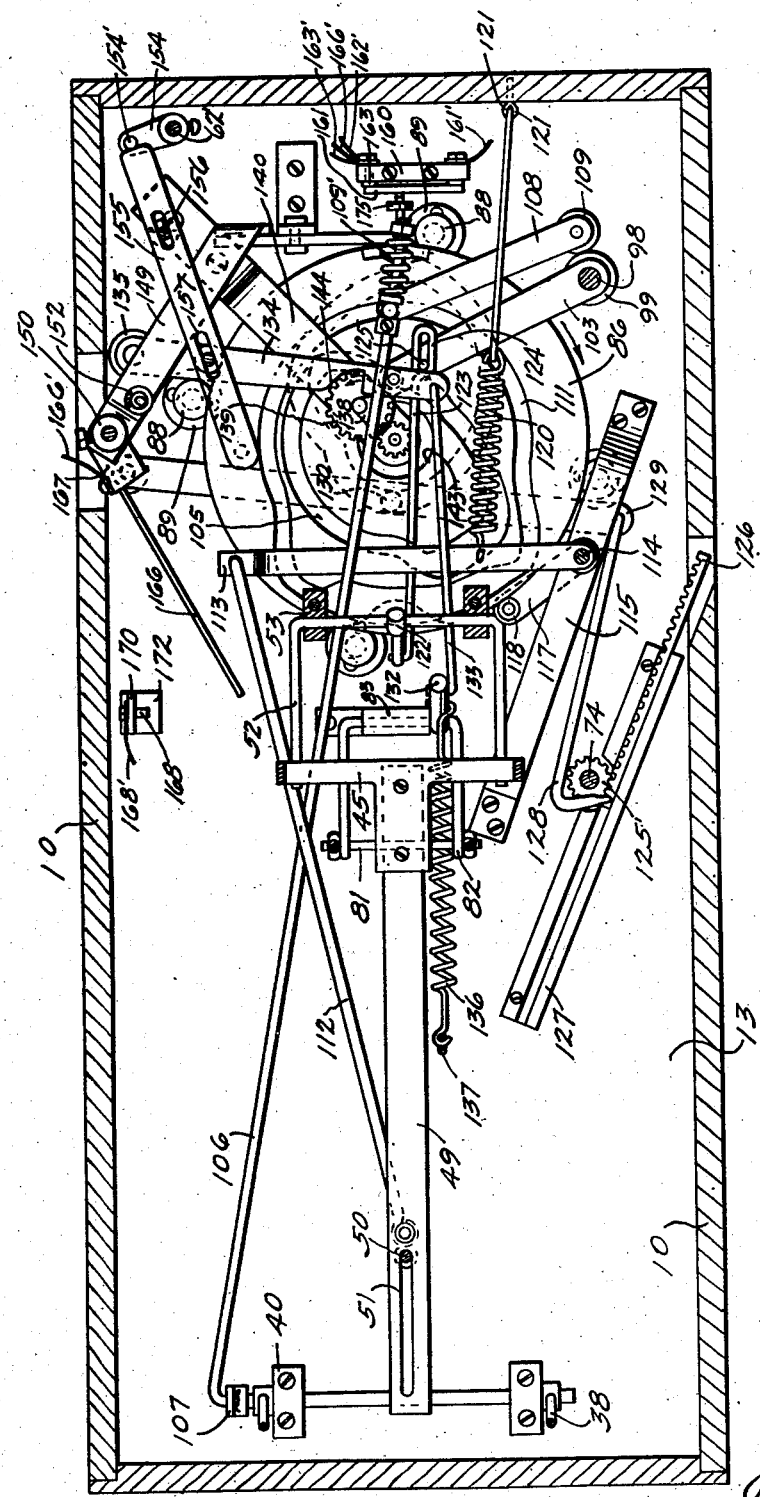
Figure 5:
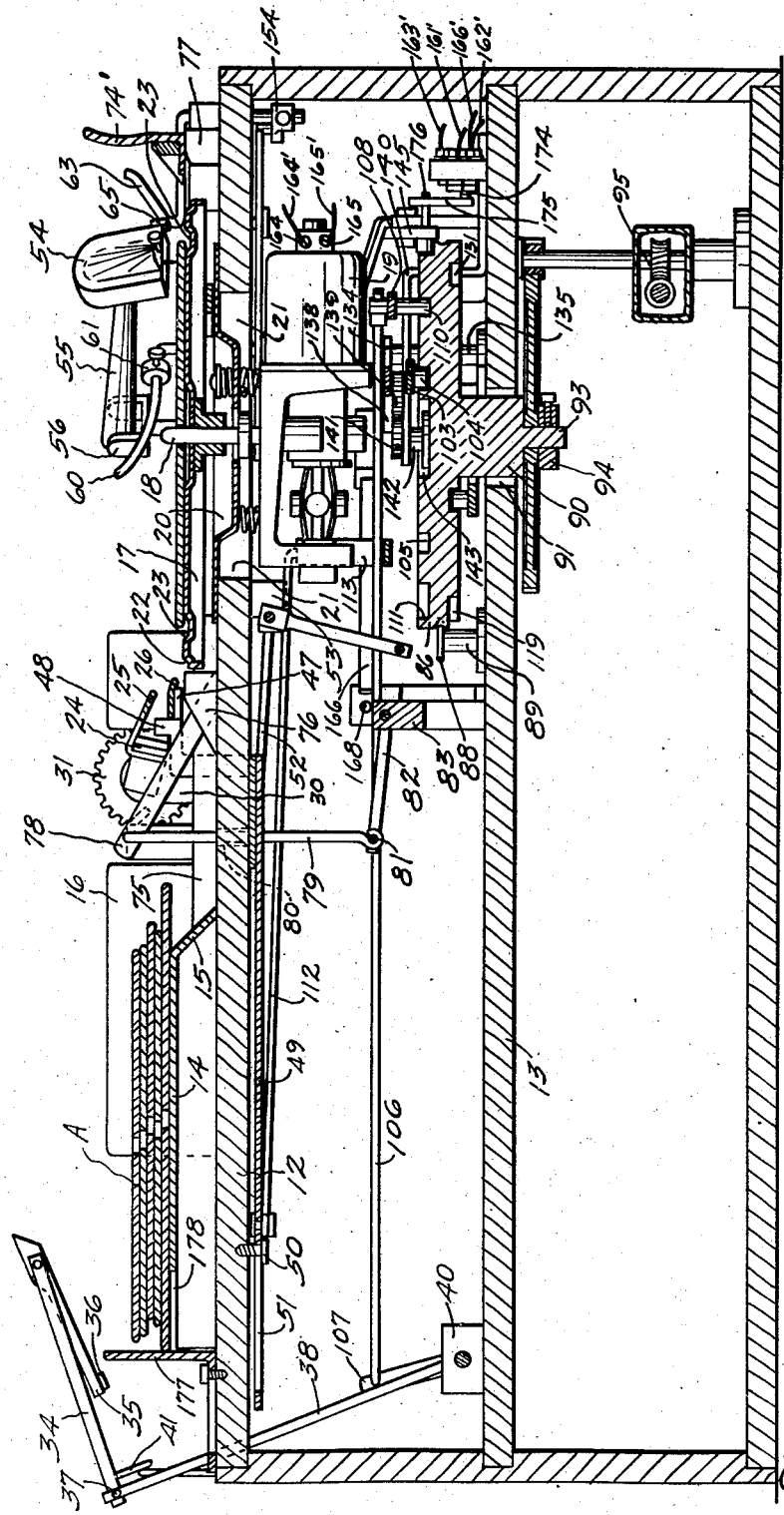

The invention will be more readily understood from a reading of the following specification and by reference to the accompanying drawings in which an example of the invention is shown, and wherein:

Figure 1 is a plan view of a device constructed in accordance with the invention, Figure 2 is a side elevation of the same, Figure 3 is an end elevation of the same, Figure 4 is a horizontal sectional view taken on the line 4—4 of Figure 2, Figure 5 is a longitudinal vertical sectional view taken on the line 5—5 of Figure 1, Figure 6 is a plan view of the cam disk, Figures 7 and 8 are partial elevations of the same taken on opposite sides of said disk, Figure 9 is a bottom view of the cam disk, Figure 10 is a perspective view of the record transferring means, Figure 11 is a detailed view of the reproducer shifting mechanism, Figure 12 is a perspective view of the record returning means, and Figure 13 is a detailed view of the record centering mechanism.

This case is a continuation in part of my copending case Serial No. 336,975, filed February 2, 1929, which has since matured into Patent No. 1,880,760.

In the drawings the numeral 10 designates a cabinet having a base 11, a top panel 12 and a center panel 13. As is best shown in Figures 1, 2 and 5, a raised platform 14 having an inclined end 15 is mounted on one end of the panel 12 for supporting a variable stack A of records. Guides 16 are provided on opposite sides of the platform for guiding the records thereon.

A turntable 17 is mounted at the other end of the panel 12 on a drive shaft 18 extending upward through the panel. The shaft has a right angle drive connection with an electric motor 19 which has the usual spring suspension from a plate 20 mounted in an opening 21 of the panel 12. This turntable is provided with an annular shoulder 22 and an annular groove 23 positioned so that the edges of the standard ten and twelve inch records will overhang the groove and shoulder respectively, as is shown in Figure 5.

A transfer cradle 24 having lips 25 and 26 with the lip 26 projecting beyond the lip 25, is mounted on a yoke 27. The yoke is rockably mounted on trunnions 28 and 29 which are journaled in supports 30 secured on the panel 12 intermediate the platform 14 and the turntable 17. A gear 31 secured on the trunnion 29 is meshed with a gear rack 32 which is slidable in a guide block 33 secured on the panel 12, whereby the reciprocation of the rack 32 will rock the transfer cradle.

Pusher arms 34 having pivoted fingers 35 with record engaging studs 36 on the ends of said fingers, are pivoted on a bar 37 mounted between the upper ends of a yoke 38. The yoke extends upwardly through slots 39 in the panel 12 from its pivotal mounting in blocks 40 located on one end of the center panel 13. Pins 41 depending from each of the pusher arms engage upright stops 42 on the panel 12 for lifting the pusher arms upward from engagement with the top record of the stack when the yoke is swung to its extreme left position (Figure 5). When the yoke is swung to the right the pusher arms will fall on the top record with the fingers lying on said record so that further movement of the yoke will cause the studs 36 to engage the edge of the record and slide said record, toward the transfer cradle for engagement therein between the lips 25 and 26. The yoke is then swung to the left so that when the transfer cradle is rocked with the record engaged therein the pusher arms will free said record.

As the transfer cradle is rocked in a clockwise direction (Figures 2 and 5) the record irrespective of its size will settle in said cradle and center itself between the rests 43 of the cradle, as is shown in Figure 10. As is best shown in Figures 1, 2, 5 and 13 a sliding ejector 44, comprising a yoke 45 having its upper ends bent at right angles thereto to form fingers 47 with lugs 48 extending upwardly from said fingers, extends upwardly through slots 46 in the panel 12 intermediate the cradle and the turntable. This ejector serves to move the record from the cradle so that the center hole of the record registers with the pin 18.

The yoke 45 is secured on one end of a slide 49 which is loosely supported beneath the panel by a headed pin 50 extending through a slot 51 in one end of the slide and secured in the panel, as is shown in Figures 2, 4 and 5. The opposite or yoke end of the slide is supported on the arms of a yoke 52 which is pivotally mounted in supporting blocks 53 depending from the panel 12, so that by swinging the yoke 52 the sliding ejector is raised or lowered; also by reciprocating the slide 49 the ejector is likewise reciprocated. Therefore, when the cradle is rocked to the position shown in Figures 1 and 2 with a record engaged in said cradle and the ejector is raised and reciprocated the lugs 48 will engage the record and eject the same from the cradle and likewise position said record upon the turntable over the center pin 18. When the cradle swings the record the latter comes to rest on the pin 18. Owing to the centering of the record the hole of the latter is alined with the pin 18, and consequently it is necessary to slide the record to register its hole with said pin. The ejector will then reverse its movement and be lowered within the slots 46 out of the way of other actuating parts.

A reproducer 54 is secured on one end of a supporting arm 55 which is pivoted at its other end in a yoke 56 on the end of a vertical shaft 57. As shown in Figure 11, the shaft depends through a bearing 58 on the panel 12 and through an opening 59 in said panel. A curved guide rod 60 mounted in a stand 61 secured on the panel 12 partially encircles the shaft 57 so that when the shaft 57 is lowered the reproducer arm 55 will engage the rod 60. This rod serves as a fulcrum for the arm 55 to raise the reproducer 54 from engagement with the record on the turntable. By reason of the upward curve of the rod the arm 55, when engaged therewith, will slide under its own weight along said rod to an adjustable stop 61, as shown in Figure 11.

The stop 61 is adjusted for positioning the arm 55 so that when the shaft 57 is raised the reproducer will be lowered to engage the reproducer needle at the beginning of the score on a twelve inch record. When a ten inch record is transferred onto the turntable a deflecting arm 62 pivotally mounted in the panel 12 and having an upturned inclined guide 63 will swing beneath the reproducer, so that when said reproducer is lowered it will engage the inclined guide and slide down the same onto the ten inch record at the beginning of its score. A wear plate 64 having a depending finger 65 is secured on the edge of the reproducer for taking the wear between the reproducer and the inclined guide. Also, the finger 65 engages over the guide to prevent the same swinging from beneath the reproducer during their engagement.

A discharging member 66 is pivotally mounted on pins 67 in upright posts 68 of a gear rack 69 which is slidably mounted in a guide track 70 secured on the panel 12. As is best shown in Figures 1, 3 and 5, the discharging member extends out over the center of the panel and has an inclined shoe 71 mounted thereon with a slot 72 extending through said shoe and said member. A gear 73 mounted on the upper end of a vertical shaft 74 is meshed with the gear rack 69 whereby the alternate rotation of said shaft will reciprocate said rack and likewise the discharging member.

As the discharging member is moved to the left (Figure 1) the shoe will ride over the turntable and engage under the edge of the record on said turntable. The inclined face of the shoe riding under the edge of the record will raise the same and free the record from engagement with the center pin 18. An arcuate wing 74' extending upwardly from the member 66 behind the shoe will then bear against the record and slide it from the turntable along runways 75 and up the inclined end 15 of the platform to the bottom of the record stack A. By reason of the slot 72 the shoe and outer end of the member 66 will clear the center pin 18, when passing thereover.

As the shoe rides off the turntable, said shoe will ride down an inclined block 76 to the panel 12 thereby lowering the shoe below the record stack A and bringing the arcuate wing opposite said stack. At this point of operation the pusher arms will be rocked sufficiently to slide the top record of the stack A against the arcuate wing. The cradle is in an upright position, as shown in Figure 10, when the wing 74' passes thereunder. The radius of the arcuate wing coincides with the radius of the path through which the lips 25 and 26 of the transfer cradle swings. Therefore, when the discharging member is stopped, the arcuate wing is engaging the edge of the record which it has just pushed onto the top of the stack. Due to the curve of said wing, the edge of the record is in alinement with the path through which the lip 26 of the cradle swings. Thus, when the discharging member is returned and the cradle rocked, the lip 26 will engage the edge of the top record which has been positioned in its path by the arcuate wing. This stops the swinging of the cradle and positions the same to receive the record the next time the pusher arms 34 are operated. On the return movement of the discharging member the shoe will ride up the block 76, across the turntable and onto a rest 77, thereby freeing said turntable.

Elevating guides 78 best shown in Figures 1, 2 and 5, are positioned intermediate the platform 14 and the turntable with the upper ends of vertical risers 79 pivoted in one end of the elevating guides. The risers extend downwardly through openings 80 in the panel 12 and are pivotally connected by a pin 81 to the outer ends of a yoke 82 which is pivoted in a bearing support 83 mounted on the panel 13. Therefore, by swinging the yoke 82 the elevating guides are raised and lowered. By raising the elevating guides when a record is being discharged from the turntable, said record will ride up the elevating guides and be returned to the top of the record stack A, whereby said record will be transferred a second successive time to the turntable and the reverse side of the record will be faced up for reproduction. The elevating guides are only raised every other time that a record is discharged from the turntable, whereby both sides of a record will be played before said record is returned to the bottom of the stack A.

Fulcrum rests 84 mounted on the panel 12 and having inclined lips 85 are provided on opposite sides of the guides 78 to serve as a fulcrum and a support for the record being returned to the top of the stack A, whereby the elevating guides after delivering the record to said fulcrum rests may drop below the level of the runways to permit the passage of the discharging member 66.

A stop 177 is adjustably mounted on the panel 12 at the left end of the platform 14 (Figure 5) for positioning the records in the stack A. If records of various sizes are placed on the platform for reproduction the stop 177 is positioned to the extreme left (Figure 5). But, when records of corresponding size are placed on the platform for reproduction, the stop is adjusted within a slot 178 in the platform to hold the records in position for engagement by the lip 26 of the cradle.

For actuating the various elements of the device, a cam disk 86, Figures 2 to 9 inclusive, having an annular groove 87 in its edge, is rotatably supported between a plurality of disk rollers 88 journaled in bearing supports 89 mounted on the panel 13. The rollers are equally spaced about the cam disk and have their edges rounded for engaging in the groove 87. A hub 90 of the cam disk extends downwardly therefrom through an opening 91 in the panel 13 and has a gear 92 secured on a reduced neck 93 of the hub by a collar 94. Clockwise rotation (Figure 4) is imparted to the gear 92 and likewise to the cam disk through a reduced gear train 95 and pulley drive 96 from an electric motor 97 mounted on the base panel 11.

For reciprocating the gear rack 32 to rock the transfer cradle, a verticle shaft 98 (Figures 1, 2, 3 and 4) is journaled in bearings 99 and 100 mounted on and in the panels 13 and 12 respectively, and extends upward through the bearing 100 and panel 12. An elongated lever 101 has one end secured to the upper end of the shaft 98 and the opposite end of the lever is pivotally connected by a link 102 to the gear rack 32. An arm 103 secured on the shaft 98 has a roller 104 at its outer end engaging in an inner cam groove 105 in the top of the cam disk, whereby the rotation of the cam disk will swing the arm 103 and lever 101 to rock the cradle.

For swinging the pusher arms 34 to engage the top record of the stack A in the transfer cradle a link 106 pivotally connects an arm 107 secured to the yoke 38 and the outer end of a lever 108 which is pivoted to a pedestal 109 mounted on the panel 13. The link 106 has a yielding spring connection 109 with the lever 108 whereby any continued actuation of the lever 108 after the swinging of the pusher arms is checked, will be absorbed by the spring 109. A roller 110 depending from the outer end of the lever is engaged in an outer cam groove 111 in the top of the cam disk, whereby the rotation of said cam disk will actuate the lever 108 to swing the yoke 32 and likewise the pusher arms.

For sliding the ejector 44 to eject the records from the transfer cradle onto the turntable, a link 112 pivotally connects the slide 49 and the outer end of a lever 113 which is secured on a vertical shaft 114. The shaft is journaled between a raised support 115 mounted on the panel 13 and a bearing 116 on the underside of the panel 12. A reduced end of the shaft extends below the support 115 and has secured thereon an arm 117 on the outer end of which is mounted a roller 118. This roller rides on the lower edge of the cam disk in the path of a cam recess 119 in the disk and the roller is held in engagement with said disk under tension of a spring 120. The spring is suspended between the lever 113 and an eyebolt 121 in the end wall of the cabinet 10. Therefore, by rotating the cam disk the arm 117 will be actuated to slide the ejector and eject the record from the cradle.

When a ten inch record is placed on the turntable the ejector 44 will travel its full distance, but if a twelve inch record is placed on the turntable the ejector will travel only until the hole in the record is registered with the pin 18 on the turntable; said record will then drop onto the turntable. The travel of the ejector being limited by the travel of the record, it is obvious that when the record stops, the ejector is also stopped. As the ejector is actuated by the tension of the spring 120 (Figure 4) the variation in the stopping of the travel of the ejector will not damage the records or the machine.

For raising and lowering the ejector an arm 122 secured on the yoke 52 has a pivotal connection with one end of a link 123 the opposite end of which is formed in an elongated eye 124. This eye is mounted over a pin 125 on the lever 103, whereby the swinging of said lever will likewise swing the yoke 52 to raise and lower the ejector as desired.

For reciprocating the discharging member 66 to discharge a record from the turntable and aid the pusher arms in positioning the top record of the stack A for engagement by the cradle, a pinion 125' secured on the lower end of the shaft 74 is meshed with a gear rack 126 which is slidably mounted in a guide block 127 secured on the panel 13. A link 128 pivotally connects the gear rack with one end of a lever 129 extending beneath the cam disk 86 and pivoted to the panel 13. A roller 130 on said lever intermediate its ends engages in a cam groove 131 in the bottom of the disk, whereby the rotation of said disk will swing the lever to reciprocate the gear rack 126 and likewise the gear rack 69 and discharging member 66.

For raising and lowering the elevating guides 78 an arm 132 secured on the yoke 82 is pivotally connected by a link 133 to one end of a lever 134 which has its opposite end pivoted to a pedestal 135 mounted on the panel 13. The lever 134 is engaged under tension of a spring 136, between the arm 132 and a hook 137 depending from the panel 12, with a cam 138 secured on a gear 139 which is rotatably mounted on a raised support 140 extending over the cam disk. The gear is rotated in a counter-clockwise direction (Figure 4) at one-half the rotative speed of the cam disk by a reduced gear 141 (Figures 4 and 5), which is secured on a stub shaft 142 centrally mounted on the cam disk in a countersink 143 therein. Thus the cam 138 will engage and actuate the lever 134 once to every two rotations of the cam disk, whereby the elevating guides 78 will rise to elevate a record to the top of the stack A every other time the records are discharged from the turntable. A recess 144 is provided in the lever 134 so that when the cam 138 engages in said recess the elevating guides 78 will drop to permit the passage of the discharging member.

For controlling the reproducer 54 (Figures 3, 4 and 11), a lever 145 pivoted to an angle support 146 has a roller 147 mounted on one end. The roller rides on the upper edge of the cam disk in the path of a cam groove 148 in the top of the disk. The opposite end of the lever 145 has a horizontal bar 149 secured thereto. The outer end of the bar is confined on the lower end of the vertical shaft 57 by collars 150 and 151. A spring 152 is mounted between the bar and an eye bolt 153 in the panel 12 to hold the roller 147 under tension in engagement with the cam disk. The spring also relieves the weight of the bar 149 from the shaft 57 when the roller is engaged in the cam groove 148, whereby the reproducer will be lowered under its own weight onto the record upon the turntable.

For swinging the deflecting arm beneath the reproducer to position the same on a ten inch record, an arm 154 (Figures 3 and 4) is secured on the lower end of a downturned leg 62' of the arm 62, which leg depends through a bearing support and the panel 12. A stud 154' on the outer end of the arm 154 engages with one end of a horizontal slide bar 155 which is suspended beneath the panel 12 by headed bolts 156 passing through slots 157 in said bar. The other end of the slide bar has a pin 158 depending therefrom in the path of the lever 113, whereby the extended movement of the lever 113, necessary for positioning a ten inch record on the turntable, will slide the bar 155 to swing the deflecting arm 62 beneath the reproducer. To swing the deflecting arm 62 from beneath the reproducer when a twelve inch record is on the turntable, a spring finger 159 depends from the arm in the path of the lever 101 for engagement by said lever when the transfer cradle is rocked in position to receive a record from the stack A. Therefore, when the cradle rocks to receive a record the deflecting arm is moved from beneath the reproducer and when a twelve inch record is positioned on the turntable the lever 113 will not swing sufficient to move the deflecting arm beneath the reproducer, whereby said reproducer will lower directly onto the twelve inch record at the beginning of its score.

A double throw electric switch 160 is provided on the panel 13 opposite the cam disk and lever 145 for controlling the intermittent and alternate rotations of the cam disk and the turntable. A switch arm 161 (Figures 3, 4 and 5) is adapted to be engaged with contact points 162 and 163. The contact point 162 is connected by a lead wire 162' to a contact point 164 of the electric motor 19. The other contact point 165 of the motor 19 is connected by a lead 165' to the negative wire of a 110 volt current (not shown), so that when the switch arm 161, which is connected by a lead 161' to the positive wire of the 110 volt circuit, is engaged with the contact point 162 the electric circuit will be completed through the motor 19 to operate the same and rotate the turntable.

The contact point 162 also has a lead 166' to a switch arm 166 of a switch 169 (Figures 4 and 11) which arm is secured in an insulated block 167 on the lower end of the shaft 57, whereby the rotation of said shaft during the reproduction of a record will swing the switch arm 166 into engagement with a contact point 168 when the end of the score on the record is reached. The contact point 168 is secured in an insulated block 170 of a support 172 mounted on the panel 13 and has a lead 168' to a contact point 171 of the electric motor 97.

The contact point 163 has a lead 163' to the contact point 171 of the electric motor 97, while the other contact point 173 of the motor is connected by a lead 173' to the negative wire of the 110 volt circuit. Therefore, when the switch arm 161 is engaged with the contact 163 the electric circuit is completed to the motor 97 to operate the same and rotate the cam disk. But when the switch arm is engaged with the contact point 162 the electric circuit is broken to the motor 97 until the reproducer reaches the end of the score on the record being reproduced at which time the electric circuit will be completed to said motor through the switch 169.

For swinging the switch arm 161 a pin 174 on said arm is pivotally connected by a link 175 with a pin 176 on the lever 145, whereby the swinging of said lever will likewise swing the switch arm 161.

In operation, the records desired to be reproduced are placed upon the platform 14, then by closing the 110 v. circuit through any suitable switch (not shown) with the switch arm 161 engaged with the contact point 163, the motor 97 will begin to operate and revolve the cam disk, thereby actuating the various elements in their respective order. The transfer cradle is rocked in a counter-clockwise direction (Figures 2 and 5) until the lip 26 engages the top record which is then pushed by the pusher arms 34 between the lips 25 and 26.

The transfer cradle is then rocked in a clockwise direction to deposit the record on the turntable. The ejector then raises and reciprocates to eject the record from the cradle and position said record on the turntable. If a ten inch record is being placed on the turntable, the travel of the ejector will cause the lever 113 to swing the deflecting arm 62 beneath the reproducer so that as the roller 147 of the lever 145 rides in the cam groove 148 the reproducer will be lowered onto the ten inch record. Also, as the roller 147 rides into the cam groove the switch arm 161 is disengaged from the contact point 163 and engaged with the contact point 162, thereby breaking the electric circuit to the motor 97 and stopping the rotation of the cam disk and completing the electric circuit to the motor 19 and starting the rotation of the turntable.

When the reproduction of the record on the turntable is complete, the switch arm 166 will engage the contact point 168 of the switch 169, whereby the electric circuit is again closed to the motor 97 to rotate the cam disk. As the cam disk begins rotating the roller 147 will ride out of the groove 148, thereby disengaging the switch arm 145 from the contact point 162 and engaging said arm with the contact point 163, thereby breaking the electric circuit to the motor 19 to stop the rotation of the turntable and also breaking the electric circuit through the switch 169 to the motor 97. But as the switch arm 161 is engaged with the contact point 163 another electric circuit is completed to the motor 97 to operate the same until the cam disk has made a complete rotation and the roller 147 again rides in the cam groove 148.

After being reproduced, the record is discharged from the turntable by the discharging member 66, which has an inclined shoe 71. As the member 66 is moved to the left (Figures 1, 2 and 5) the shoe 71 will ride over the turntable and engage under the edge of the record on said turntable. The inclined face of the shoe riding under the edge of the record will raise the same and free the record from engagement with the center pin 18, whereby the wing 74', extending upwardly from the member 66 behind the shoe, will engage the record and slide it from the turntable along the runways 75. By reason of the slot 72, the shoe and the outer end of the member 66 will clear the center pin 18 when passing thereover.

The shoe riding off of the turntable will move down an inclined block 76, thereby lowering said shoe below the record stack A and bringing the arcuate wing 74' opposite said stack. As the discharging member 66 continues to move to the left, the cradle 24 is rocked so that when the wing 74' passes thereunder the cradle is in an upright position. The elevating guides 78 are raised and the record will ride up the elevating guides and be returned to the top of the record stack, whereby said record will be ready to be transferred a second successive time to the turntable. The discharging member will return to its original position, the shoe riding up the blocks 76, across the turntable and onto a rest 77. The cradle continues its rocking until the lip 26 engages the top record. At this point of the operation, the pusher arms 34 will be rocked sufficiently to slide said record in between the lips 25 and 26.

The cradle is again rocked in a clockwise direction to deposit the record on the turntable and the reverse side of the record will be faced up for reproduction. After this side has been reproduced, the member 66 again moves to the left, the shoe lifting the record and the wing bearing against the record and sliding it from the turntable along the runways and up the inclined end 15 of the platform to the bottom of the stack A. The discharging member returns to its original position and the lip 26 of the cradle engages the top record and the entire operation is ready to be repeated.

It is obvious that the operations of the various elements are entirely synchronous and automatic and perform the functions of reproducing first one side of a record and then the other side, then returning the record to the bottom of the stack A and taking a second record from the top of the stack for reproduction.

Various changes in the size and shape of the different parts, as well as modifications and alterations, may be made within the scope of the appended claims.

Having illustrated and described a preferred form of the invention, what I claim, is:

1. In a sound reproducing apparatus, a rotatable turntable, a plurality of records of different diameters arranged in a stack, a transferring device for receiving a record from the stack for delivery to the turntable, means for positioning the record irrespective of its diameter at a common point for delivery to the transferring device, means for dislodging the record from the stack into said device, and automatically operated means for ejecting the record from the transferring device onto the turntable.

2. In an automatic sound reproducing apparatus, a rotatable turntable, a plurality of records of different diameters arranged in a stack, means for transferring a record from the stack to the turntable, means for ejecting the record from the transferring means onto the turntable, including means for centering the record irrespective of its diameter with relation to the center of the turntable, means for reproducing the record including a stylus engaging said record, means for engaging and disengaging the reproducing means with and from the record, a gravity slide for shifting the reproducing means from the end of the score on a record to the beginning of the score on a succeeding record, and automatically operated means for positioning the reproducing means in engagement with the beginning of the score on a record irrespective of the diameter of said record.

3. In a sound reproducing apparatus, a stack of records, a rotatable turntable, means intermediate the stack and the turntable for receiving a record and arranged to swing to invert the record with respect to its stacked position, means for discharging the record from said swinging means onto the turntable, means for reproducing the record, means for dislodging a reproduced record from the turntable and returning it to the stack, and means for directing the returned record either under the stack or on top of the stack.

4. In a sound reproducing apparatus, a rotatable turntable, a plurality of records of different diameters arranged in a stack, a transferring device for receiving a record from the stack for delivery to the turntable, means for positioning the record irrespective of its diameter at a common point for delivery to the transferring device, automatically operated means for ejecting the record from the transferring device onto the turntable, and elevating guides for guiding a record from the turntable to the top of the stack of records.

5. In a sound reproducing apparatus, a rotatable turntable, a plurality of records of different diameters arranged in a stack, a transferring device for receiving a record from the stack for delivery to the turntable, means for positioning the record irrespective of its diameter at a common point for delivery to the transferring device, automatically operated means for ejecting the record from the transferring device onto the turntable including means for centering the record irrespective of its diameter with relation to the center of the turntable, and elevating guides for guiding a record from the turntable to the top of the stack of records.

6. In an automatic sound reproducing apparatus, a rotatable turntable, a plurality of records of different diameters arranged in a stack, means for transferring a record from the stack to the turntable, means for ejecting the record from the transferring means onto the turntable, including means for centering the record irrespective of its diameter with relation to the center of the turntable, means for reproducing the record including a stylus engaging said record, means for engaging and disengaging the reproducing means with and from the record, a gravity slide for shifting the reproducing means from the end of the score on a record to the beginning of the score on a succeeding record, automatically operated means for positioning the reproducing means in engagement with the beginning of the score on a record irrespective of the diameter of said record, and elevating guides for intermittently guiding a record from the turntable to the top of the stack of records.

7. In a sound reproducing apparatus, a rotatable turntable, a plurality of records of different diameters arranged in a stack, a transferring device for receiving a record from the stack for delivery to the turntable, means for positioning the record irrespective of its diameter at a common point for delivery to the transferring device, means for dislodging the record from the stack into said device, and automatically operated means for ejecting the record from the transferring device onto the turntable including means for centering the record irrespective of its diameter with relation to the center of the turntable.

8. In a sound reproducing apparatus, the combination with a stack of disk records, a rotatable turntable, a swinging cradle mounted between the turntable and the stack of records for swinging said records, means for pushing a record from the stack of records to the cradle, means for returning a record from the turntable to the stack, and elevating guides for guiding a record from the turntable to the top of the stack of records.

9. An automatic reproducing apparatus for reproducing sounds from records of different diameters comprising, a plurality of irregularly stacked records of various diameters, means for dislodging a record from the stack, a rotatable turntable, a swinging element for swinging said record from the top of the stack to the turntable and including means for positioning said record with respect to the turntable irrespective of the diameter of said record, whereby each record is lowered with its center opening in alinement with the center of the turntable.

ROY B. BRYANT.